(12) United States Patent
Freitag

(10) Patent No.: US 11,273,550 B2
(45) Date of Patent: Mar. 15, 2022

(54) TOOL FOR ASSISTING THE PROCESS OF MARKING OR CUTTING

(71) Applicant: Angle.Design ApS, Rødvig Stevns (DK)

(72) Inventor: Niels Freitag, Store Heddinge (DK)

(73) Assignee: Angle.Design ApS, Rødvig Stevns (DK)

( * ) Notice: Subject to any disclaimer, the term of this patent is extended or adjusted under 35 U.S.C. 154(b) by 63 days.

(21) Appl. No.: 17/017,946

(22) Filed: Sep. 11, 2020

(65) Prior Publication Data
US 2021/0001474 A1 Jan. 7, 2021

Related U.S. Application Data

(63) Continuation of application No. PCT/DK2019/050072, filed on Feb. 25, 2019.

(30) Foreign Application Priority Data

Mar. 12, 2018 (DK) .............................. PA201800115

(51) Int. Cl.
| | | |
|---|---|---|
| *B25H 7/02* | (2006.01) | |
| *B23C 5/02* | (2006.01) | |
| *G01B 3/04* | (2006.01) | |
| *B23D 59/00* | (2006.01) | |
| *B26B 29/06* | (2006.01) | |

(52) U.S. Cl.
CPC ................ *B25H 7/02* (2013.01); *B23C 5/02* (2013.01); *G01B 3/04* (2013.01); *B23D 59/001* (2013.01); *B26B 29/06* (2013.01)

(58) Field of Classification Search
None
See application file for complete search history.

(56) References Cited

U.S. PATENT DOCUMENTS

| | | | | |
|---|---|---|---|---|
| 327,283 | A * | 9/1885 | Levy ........................ | G01B 3/56 33/421 |
| 1,209,855 | A * | 12/1916 | Follette .................... | G01B 3/06 33/463 |
| 3,153,859 | A * | 10/1964 | Jones .................. | E04G 21/1891 33/419 |
| 4,348,815 | A * | 9/1982 | Hurt ......................... | B43L 7/12 33/419 |
| 4,916,822 | A * | 4/1990 | Johnson ................. | G01B 3/006 33/421 |

(Continued)

FOREIGN PATENT DOCUMENTS

| | | |
|---|---|---|
| CN | 201227919 | 4/2009 |
| CN | 106584414 B | 4/2019 |

(Continued)

*Primary Examiner* — Christopher W Fulton
(74) *Attorney, Agent, or Firm* — Elevated IP, LLC

(57) ABSTRACT

A tool for assisting the process of marking or cutting structures in a predefined manner is disclosed. The tool comprises a rod member having a longitudinal axis and a plate member rotatably attached to the rod member. The tool comprises an arm removably attached to the rod member and to the plate member. The plate member is rotatably attached to the rod member by means of a structure comprising a joint and one or more magnetic or magnetizable structures configured to provide a magnetic force between the rod member and the plate member.

13 Claims, 7 Drawing Sheets

(56) References Cited

U.S. PATENT DOCUMENTS

| | | | | |
|---|---|---|---|---|
| 4,955,141 A | * | 9/1990 | Welch | G01B 3/56 33/418 |
| 5,183,373 A | | 2/1993 | Floyd, Jr. | |
| 5,384,967 A | * | 1/1995 | Helmuth | B43L 7/10 33/416 |
| 5,414,938 A | * | 5/1995 | Meek | B25H 7/02 33/452 |
| 5,438,761 A | | 8/1995 | Krumszyn et al. | |
| 5,471,753 A | | 12/1995 | Rodrigues | |
| 5,491,906 A | * | 2/1996 | Reilly | B23D 59/00 33/471 |
| 5,603,164 A | | 2/1997 | Haddix | |
| 5,771,767 A | * | 6/1998 | Itami | B25H 7/00 144/216 |
| 5,813,126 A | * | 9/1998 | Dahl | B25H 1/0078 33/42 |
| 6,604,294 B1 | | 8/2003 | Farley | |
| 6,708,422 B1 | * | 3/2004 | Stojanovski | B23Q 9/005 33/42 |
| 6,839,974 B1 | * | 1/2005 | Hitchcock | B25H 7/00 33/419 |
| 7,082,692 B2 | * | 8/2006 | Shapiro | B43L 7/10 33/464 |
| 7,797,842 B2 | * | 9/2010 | Fernandes | B43L 9/007 33/27.03 |
| 7,974,453 B2 | | 7/2011 | Wong et al. | |
| 8,015,720 B1 | | 9/2011 | Russo | |
| 8,250,771 B2 | * | 8/2012 | Pinal | G01B 3/04 33/471 |
| 8,375,592 B1 | * | 2/2013 | Holt | B43L 7/12 33/456 |
| 2003/0041467 A1 | | 3/2003 | Evans | |
| 2004/0006880 A1 | * | 1/2004 | Evans | G01B 3/566 33/460 |
| 2011/0107610 A1 | * | 5/2011 | Farr | E04F 21/0076 33/421 |
| 2012/0180330 A1 | * | 7/2012 | Noble | G01C 9/00 33/343 |
| 2014/0373372 A1 | * | 12/2014 | Flippo | B43L 7/10 33/418 |
| 2016/0271789 A1 | | 9/2016 | Foster | |

FOREIGN PATENT DOCUMENTS

| | | | | |
|---|---|---|---|---|
| GB | 2396432 A | * | 6/2004 | B43L 7/12 |
| SE | 1450535 A1 | | 11/2015 | |
| WO | 9524609 A1 | | 9/1995 | |
| WO | 2014121698 A1 | | 8/2014 | |

\* cited by examiner

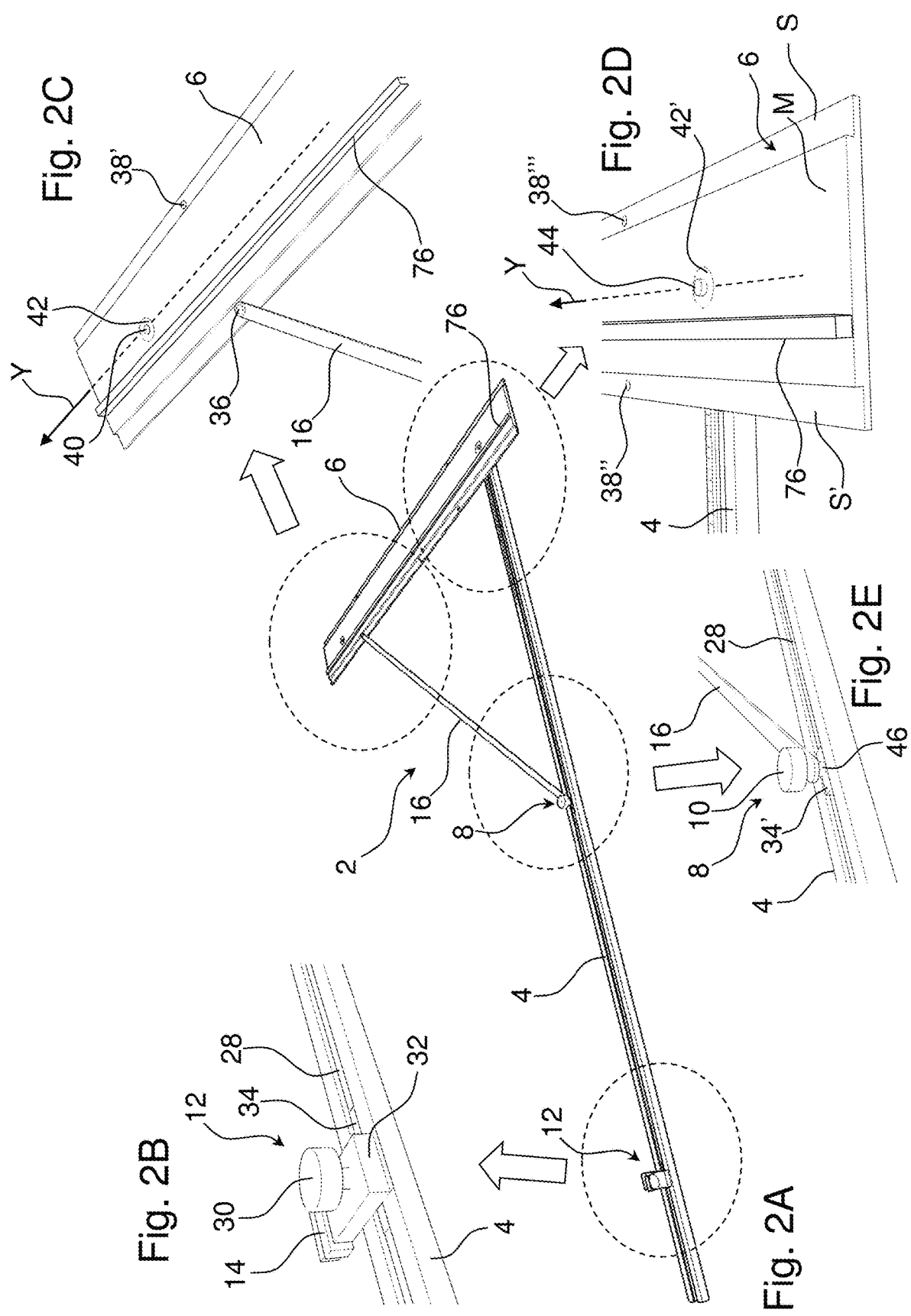

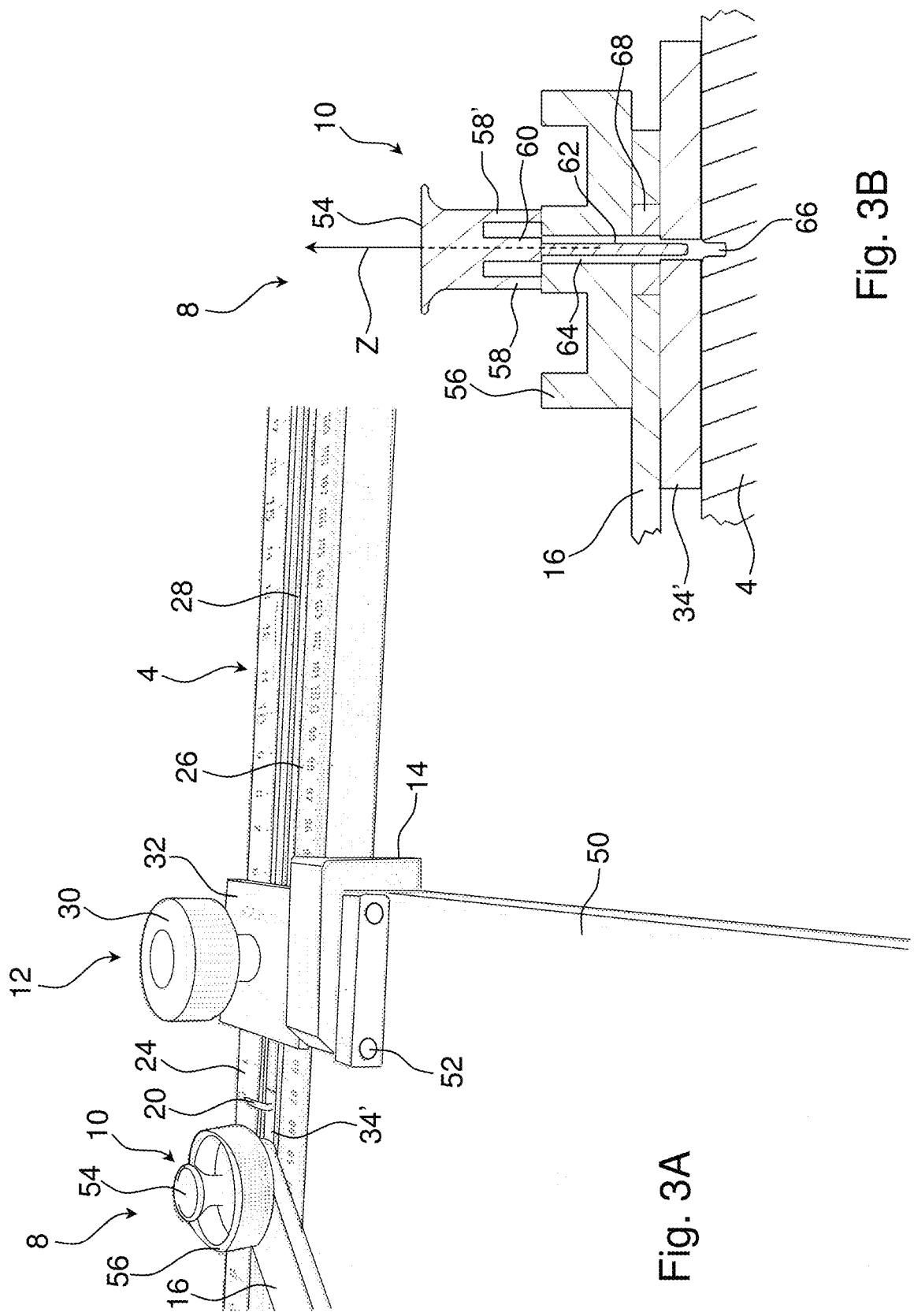

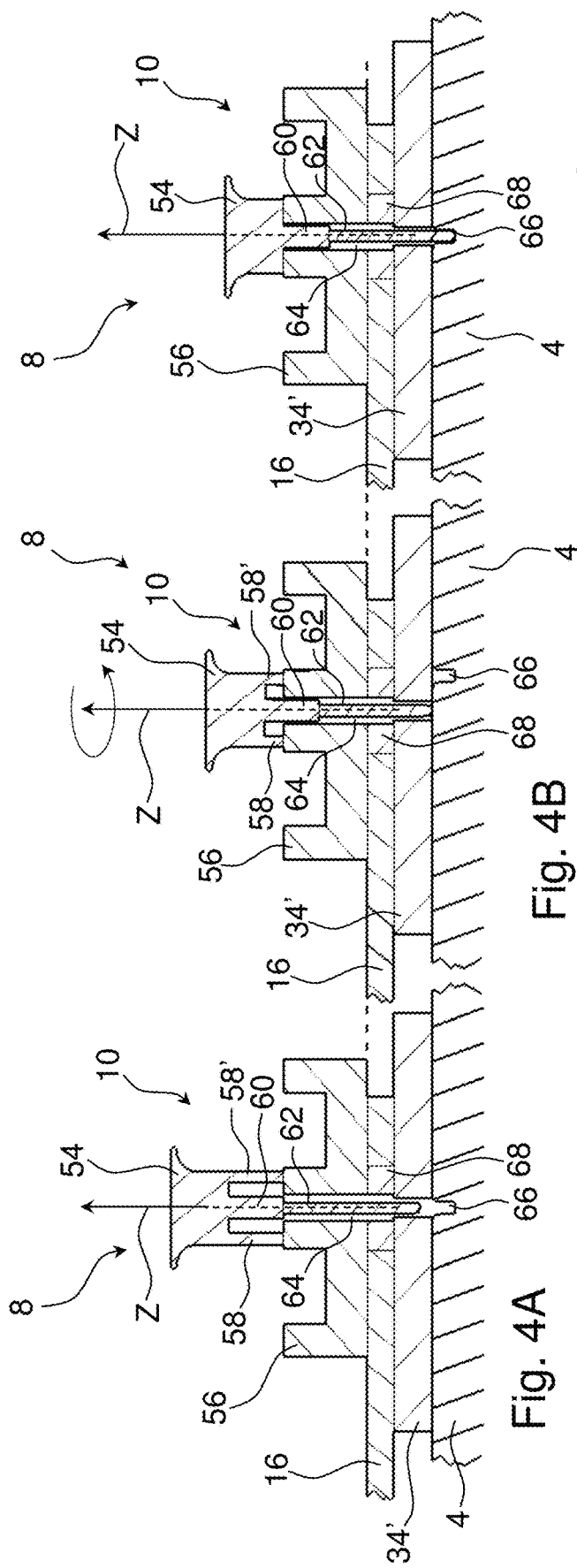

Fig. 7A
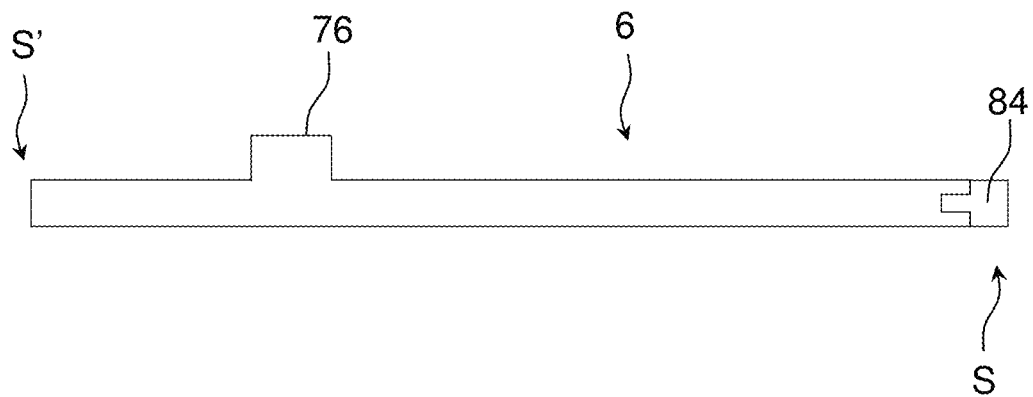
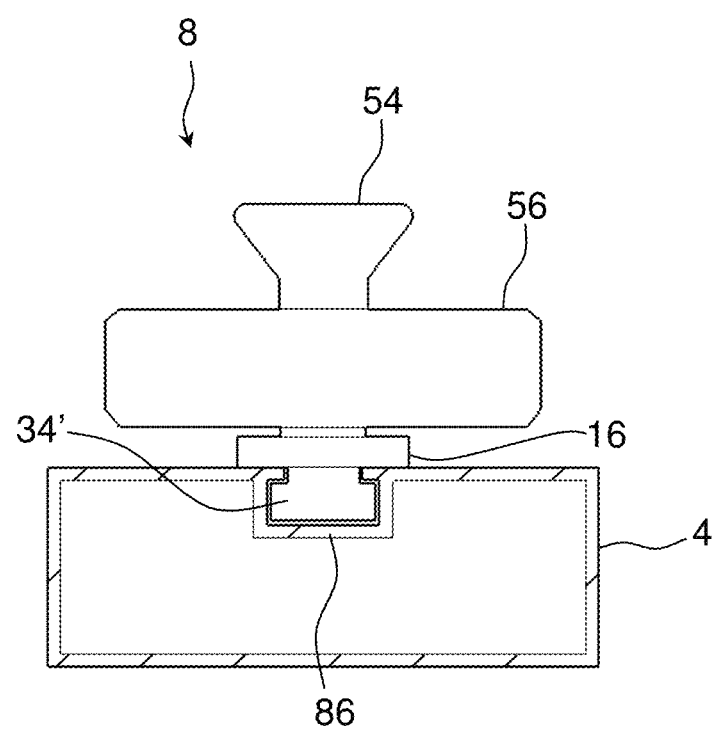
Fig. 7B

US 11,273,550 B2

TOOL FOR ASSISTING THE PROCESS OF MARKING OR CUTTING

CROSS-REFERENCE TO RELATED APPLICATIONS

This application is a continuation under 35 U.S.C. 111 of International Patent Application No. PCT/DK2019/050072, filed Feb. 25, 2019, which claims the benefit of and priority to Danish Application No. PA 2018 00115, filed Mar. 12, 2018, each of which is hereby incorporated by reference in its entirety.

FIELD OF INVENTION

The present invention relates to a tool for assisting the process of marking or cutting structures in a predefined manner. The present invention more particularly relates to a tool for assisting the process of marking or cutting a structure, such as a plate, into a predefined length and a predefined angle.

BACKGROUND

When plate structures, e.g. for construction purposes, have to be used, it is usually necessary to reduce the length of the structure and/or change the angle between adjacent side portions of the structure. Accordingly, several tools have been proposed for assisting the process of marking or cutting structures in a predefined manner. These tools typically comprise a measuring rod and a plate member rotatably attached thereto. The prior art tools are typically difficult and time-consuming to assemble and disassemble or take up a lot of space if the plate member is permanently attached to the rod member. For this reason, the prior art tools are not user-friendly.

A prior art tool is disclosed in WO 2014121698A1, wherein sets of rulers are disclosed, each comprising a longitudinal, through going groove in which sliders are provided and adapted to move along the length of the groove and whereby each slider comprises a plug post and a opposed socket hole, such that the plug post of one slide may be introduced into and maintained within the socket hole of an adjacent slider, whereby magnets are provided at the socket hole for maintaining connection through magnetic forces between adjacent sliders. The tool is not usable for drawing or cutting, as sliders are forcefully interconnected by magnetic forces, whereas the rulers are not and may thus both slide and turn with respect to each other.

U.S. Pat. No. 5,438,761A discloses a triangular measurement structure, where a ruler is slidingly connected to a second elongate member, and where a magnetic member is provided to maintain contact between the slider member and the ruler. An arm is provided between the elongate member and the ruler but is not readily detachable from the ruler and the elongate member.

US2003041467A1 shows a foldable triangle, which comprises movable joints at two opposed ends of one hypotenuse leg thereof, and an openable joint with magnetic inserts at a third joint in order to latch together the two non-hypotenuse legs. Once the magnetic inserts join at the third joint, the triangle becomes immovable and no adjustability is possible of angles.

U.S. Pat. No. 5,603,164A shows a tool for assisting the process of marking or cutting structures in a predefined manner, wherein the tool comprises a rod member having a longitudinal axis and a plate member rotatably attached to the rod member and an arm attached to the rod member and attached to the plate member, and where the plate member is rotatably attached to the rod member by means of a structure comprising a joint. This tool cannot readily be taken apart or re-assembled.

Accordingly, there is a need for a tool that reduces or even eliminates the above-mentioned disadvantages of the prior art.

SUMMARY

It is an object of the present invention to provide a tool for assisting the process of marking or cutting structures in a predefined manner, wherein the tool is easy and fast to assemble and disassemble, and wherein the tool does not take up a lot of space when disassembled.

The tool according to the invention is a tool for assisting the process of marking or cutting structures in a predefined manner, wherein the tool comprises a rod member having a longitudinal axis and a plate member rotatably attached to the rod member, wherein the tool comprises an arm removably attached to the rod member and to the plate member, wherein the plate member is rotatably attached to the rod member by means of a structure comprising a joint and where one or more magnetic or magnetizable structures are configured to provide a magnetic force between the rod member and the plate member and one or more magnetic or magnetizable structures are configured to provide a magnetic force between the arm and the plate member, which is rotatably attached to the rod member by means of a pivot joint comprising a cylindrical pin member inserted into a corresponding receiving portion in the plate member. In an embodiment, the cylindrical pin member is at least partly surrounded by a plane structure in the rod made of a magnetic or magnetizable material, wherein the receiving portion in the plate member is arranged and configured to be brought into contact with the plane structure, wherein the plane structure in the rod and the receiving portion in the plate member are made of materials ensuring that the plane structure and the receiving portion are attracted to each other by magnetic attraction.

Hereby, it is possible to provide a tool for assisting the process of marking or cutting structures in a predefined manner, wherein the tool is easy and fast to assemble and disassemble.

The tool is intended to be used to assist the process of marking or cutting structures in a predefined manner. The tool can be used for marking up a plasterboard or a chipboard in order to cut it in a predefined manner. The tool may also be used to cut a plate by using the plate member as a guiding structure, wherein a cutting tool can be used to cut by moving it along the side portion of the plate member.

The tool comprises a rod member having a longitudinal axis and a plate member rotatably attached to the rod member. The rod member may have any suitable size and geometry. The rod member may be an elongated structure having a constant cross section. The rod member may be basically box-shaped.

The plate member may have any suitable size and geometry. The plate member may be an elongated structure having a constant cross section. The plate member may be shaped as a flat box. It may be an advantage that the plate member is symmetric. The plate member may have a rectangular cross section.

The tool comprises an arm removably attached to the rod member and to the plate member. In an embodiment according to the invention, the arm is rotatably attached to the rod member and to the plate member.

The arm may be rotatably attached to the plate member by means of a structure comprising a joint and one or more magnetic or magnetizable structures configured to provide a magnetic force between the arm and the plate member.

Hereby, the tool can be assembled and set in a fast and easy manner.

The plate member is rotatably attached to the rod member by means of a structure comprising a joint and one or more magnetic or magnetizable structures configured to provide a magnetic force between the rod member and the plate member.

The magnetic attraction ensures that the rod member and the plate member are held together by the magnetic force. Moreover, the magnetic attraction facilitates the attachment of the rod member to the plate member.

It may be an advantage that the plate member is rotatably attached to the rod member by means of a pivot joint comprising a cylindrical pin member inserted into a corresponding receiving portion.

Hereby, the rod member can be easily attached to the plate member. Moreover, a robust and reliable construction can be provided.

In one embodiment of the invention, the pin member is attached to the rod member, and a corresponding structure having a bore is provided in the plate member.

In another embodiment of the invention, the pin member is attached to the plate member, and a corresponding structure having a bore is provided in the rod member.

It may be advantageous that the cylindrical pin member is at least partly surrounded by a structure, such as a plane structure made of a magnetic or magnetizable material, wherein the receiving portion is arranged and configured to be brought into contact with the structure, wherein the structure and the receiving portion are made of materials ensuring that the structure and the receiving portion are attracted to each other by magnetic attraction.

Hereby, it is possible to provide a simple, reliable and user-friendly way of attaching the rod member to the plate member.

It may be beneficial that the tool comprises a setting device removably attached to the rod member, wherein the setting device comprises a fixation member moveably attached to the setting device.

Hereby, the setting device can be arranged in a desired position on the rod member, whereby the plate member can be used to mark or cut a structure in a predefined manner.

The setting device may comprise a fixation member that is rotatably attached to the setting device.

It may be an advantage that the tool comprises a setting device slidably attached to the rod member, e.g. to a groove provided in the rod member.

It may be advantageous that the setting device comprises a plate portion and a L-shaped fixation member rotatably attached to the plate portion.

Hereby, the L-shaped fixation member can be brought into abutting engagement with the end portion of the structure to be marked or cut. Hereby, the structure to be cut or marked can be maintained in a fixed position with respect to the setting device.

It may be an advantage that the setting device comprises a plate portion provided with a recess, and that the L-shaped fixation member is configured to be brought into a position in which at least a portion of the L-shaped fixation member is arranged in the recess.

It may be beneficial that the fixation member is rotatably attached to a plate portion of the setting device by means of a shaft extending through the end portion of the plate portion, through the recess and further through a bore provided in the L-shaped fixation member.

It may be advantageous that the tool comprises an angle setting device removably attached to the rod member.

Hereby, the angle setting device can be used to change the attachment position of the arm on the rod member. Accordingly, the angle between the rod member and the plate member can be changed by using the angle setting device.

It may be advantageous that the tool comprises an angle setting device slidably attached to the rod member.

Hereby, the angle setting device can be used to change the attachment position of the arm on the rod member by sliding the angle setting device along the length of the rod member, e.g. along a groove provided in the rod member extending along the length of the rod member. Therefore, the angle between the rod member and the plate member can be changed by sliding the angle setting device.

It may be an advantage that the angle setting device comprises a locking structure comprising an engagement structure which is configured to (lockingly) engage with a corresponding engagement structure provided in the rod member.

Hereby, the locking structure can be used to fix the angle setting device to the rod member in one or more predefined positions. This may be an advantage if one or more predefined angular settings are more frequent than others.

It may be an advantage that the locking structure comprises an engagement structure formed as a male part configured to be received by a corresponding engagement structure formed as a female part and provided in the rod member.

Hereby, a simple and reliable construction can be provided.

In one embodiment according to the invention, the locking structure comprises an engagement structure formed as a rod-shaped pin member, wherein the locking structure is slidably attached to another structure of the angle setting device.

Hereby, it is possible to provide a simple, strong and reliable construction that is easy to use.

It may be an advantage that the angle setting device comprises a finger screw and a locking structure comprising support legs which are configured to rest on the support structure of the central portion of the finger screw, wherein a number of bores adapted to receive the support legs are provided in the support structure.

Hereby, it is possible to displace the locking structure relative to the support structure by using simple means.

It may be beneficial that the bores are configured to receive the support legs when the locking structure is displaced (towards the rod member) along the longitudinal axis of the locking structure.

It may be advantageous that the locking structure is rotatably arranged in the angle setting device, and that the bores in the support structure are arranged in such a manner that the rotation of the locking structure about its longitudinal axis can bring the support legs into engagement with the bores.

Hereby, it is possible to provide a simple construction that is easy to use.

It may be an advantage that the rod member is provided with a first scale portion. The first scale portion may be provided to indicate the angular position of the plate member relative to the longitudinal axis of the rod member or a direction perpendicular thereto. The first scale portion may be provided to indicate the distance from the plate member to a setting device attached on the rod member.

It may be an advantage that the rod member is provided with a second scale portion. The second scale portion may be provided to indicate the angular position of the plate member relative to the longitudinal axis of the rod member or a direction perpendicular thereto. The second scale portion may be provided to indicate the distance from the plate member to a setting device attached on the rod member.

In one embodiment according to the invention, the first scale portion indicates the angle between the rod member and the plate member.

In one embodiment of the invention, the first scale portion indicates the difference between 90 degrees and the angle between the rod member and the plate member. In this embodiment, the first scale portion indicates the value zero if the angle between the rod member and the plate member is 90 degrees.

It may be an advantage that the angle setting device comprises a pointer adapted to indicate the angle or angular displacement (relative to 90 degrees) on the first scale portion.

It may be beneficial that the rod member is provided with one or more recesses at predefined positions.

It may be an advantage that these predefined positions correspond to predefined angular positions e.g. the angular position in which the pointer indicates a predefined angular value e.g. corresponding to a number of predefined values.

The rod member may comprise several recesses at predefined angular values. Hereby, it is possible to set the angle setting device into these predefined angular positions (e.g. 0 degrees, 11.25 degrees, 22.5 degrees and 45 degrees) in an easy and user-friendly manner.

In an embodiment according to the invention, the tool comprises an angle setting device that is slidably attached to the rod member. The angle setting device comprises a knob having a pin configured to be displaced in order to engage with a corresponding receiving structure (recess or bore) provided in the bottom portion of the groove.

It may be advantageous that a groove extends along the length of the rod member, e.g., along the entire length of the rod member.

Hereby, it is possible to slidably attach one or more structures to the rod member and to tighten these structures to the rod member in an easy manner.

It may be beneficial that the tool comprises one or more sliding blocks slidably arranged in the groove of the rod member.

Hereby, the sliding blocks can be arranged in the groove and be slidably displaced in order to position one or more structures e.g. an angle setting device and a setting device in predefined positions.

It may be an advantage that the plate member is provided with holes arranged along the longitudinal axis of the plate member.

Hereby, it is possible to turn the plate member (rotate it 180 degrees) and still attach it to the rod member.

It may be beneficial that additional holes are provided in the plate member, wherein the additional holes are provided symmetrically with respect to the longitudinal axis of the plate member.

Hereby, it is possible to turn the plate member (rotate it 180 degrees) or displace the plate member and still attach it to the arm member.

It may be advantageous that the tool comprises an additional rod member provided with an attachment structure adapted to engage with a corresponding attachment structure of the rod member.

Hereby, the length of the rod member can be extended. This may be an advantage when handling long structures such as long plates.

The rod member may be provided with a receiving portion arranged in the distal end of the rod member. The receiving portion may be adapted to receive a corresponding insert portion of an additional rod member arranged next to the rod member.

Hereby, it is possible to elongate the rod member by the additional rod member.

The additional rod member may be provided with a first scale portion and a second scale portion. The first scale portion may be indicative of the angle between the rod member and the plate member. In one embodiment of the invention, the first scale portion indicates the difference between 90 degrees and the angle between the rod member and the plate member.

The rod member may be produced of any suitable material. It may be an advantage that the rod member is produced of a plastic material, wood or metal, e.g. aluminum or steel.

The plate member may be produced of any suitable material. It may be an advantage that the plate member is produced of a plastic material, wood or metal, e.g. aluminum or steel.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 2A shows another perspective, top view of a tool according to the invention;

FIG. 2B shows a close-up view of the setting device of the tool shown in FIG. 2A;

FIG. 2C shows a close-up view of the arm attached to the plate member of the tool shown in FIG. 2A;

FIG. 2D shows a close-up view of the plate member attached to the rod member of the tool shown in FIG. 2A;

FIG. 2E shows a close-up view of the angle setting device of the tool shown in FIG. 2A;

FIG. 3A shows a close-up view of a setting device with a fixation member attached to the end portion of a plate;

FIG. 3B shows a schematic, cross-sectional view of an angle setting device of a tool according to the invention;

FIG. 4A shows a cross-sectional view of an angle setting device of a tool according to the invention, wherein the angle setting device is in a configuration, in which the locking pin is raised above a recess provided in the rod member;

FIG. 4B shows a cross-sectional view of the angle setting device shown in FIG. 4A in another configuration;

FIG. 4C shows a cross-sectional view of the angle setting device shown in FIG. 4A and in FIG. 4B in a configuration, in which the locking pin engages a corresponding recess in the rod member;

FIG. 4D shows a top view of a section of a rod member and an angle setting device slidably attached thereto;

FIG. 7A shows a schematic end view of a plate member according to the invention; and FIG. 7B shows a schematic end view of a rod member according to the invention.

DETAILED DESCRIPTION

Referring now in detail to the drawings for the purpose of illustrating various embodiments of the present invention.

A tool 2 of the present invention is illustrated in FIG. 1. The tool 2 is intended to be used to cut plates into desired lengths and angles.

Figures 1A, 1B:
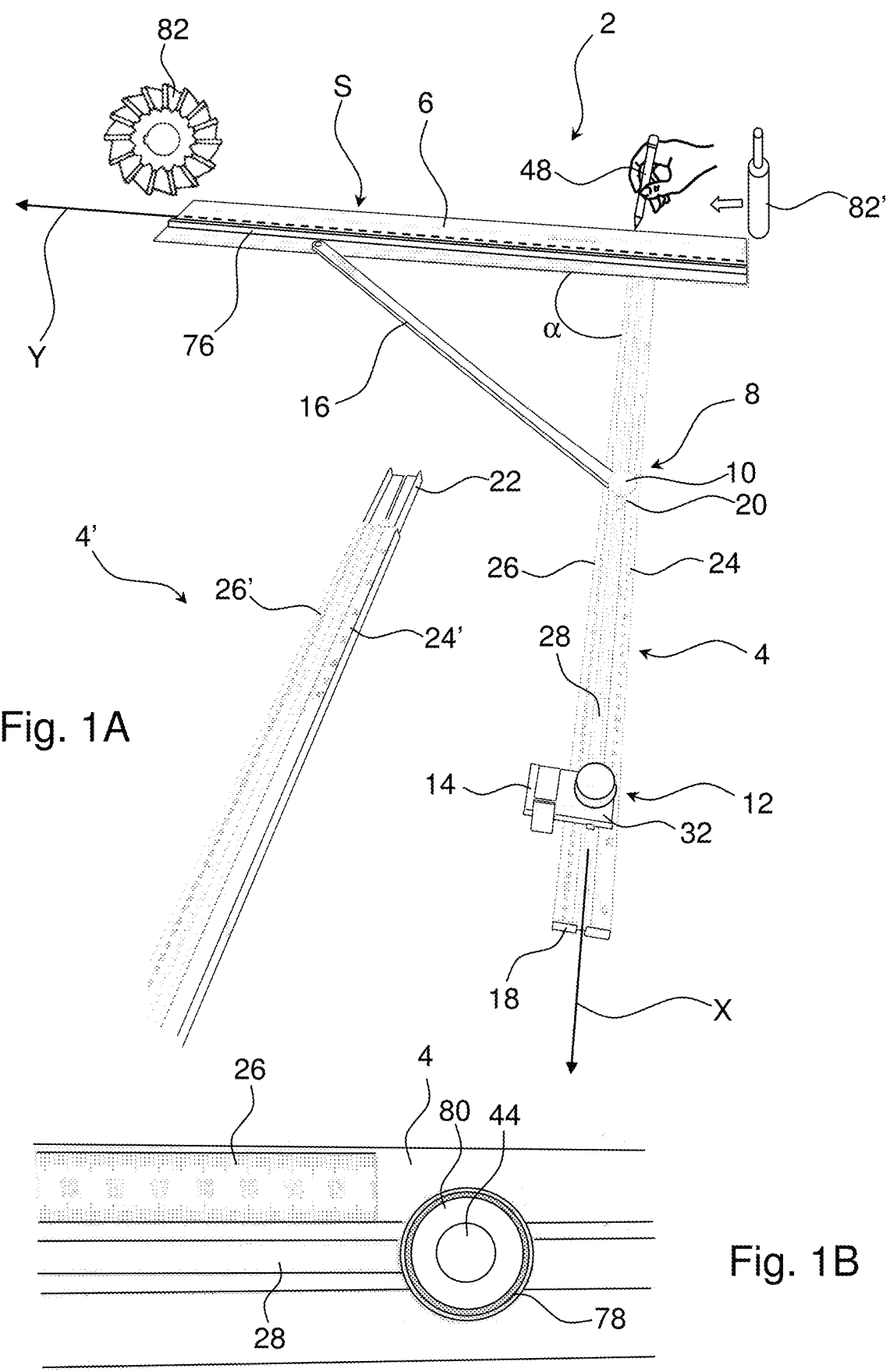
FIG. 1A shows a schematic, perspective, top view of a tool according to the invention.
FIG. 1B shows a schematic, top view of a section of a rod member of a tool according to the invention.

FIG. 1A illustrates a schematic, perspective, top view of a tool 2 according to the invention. The tool 2 comprises a rod member 4 having a longitudinal axis X and a plate member 6 detachably attached to the rod member 4. The plate member 6 has a longitudinal axis extending at an angle α to the longitudinal axis X of the rod member 4. The angle α between the rod member 4 and the plate member 6 can be set at 90 degrees.

The rod member 4 is provided with a centrally arranged groove 28 extending along the entire length of the rod member 4. The rod member 4 is provided with a first scale portion 24 and a second scale portion 26. The first scale portion 24 indicates the angle between the rod member 4 and the plate member 6. In one embodiment of the invention, the first scale portion 24 indicates the difference between 90 degrees and the angle between the rod member 4 and the plate member 6. In this embodiment, the first scale portion 24 indicates the value zero if the angle between the rod member 4 and the plate member 6 is 90 degrees. In FIG. 1, the angle α between the rod member 4 and the plate member 6 is 90 degrees.

The plate member 6 has a rectangular shape and is provided with a straight side portion S. The straight side portion S is configured to be used to indicate a cutting line e.g. by using a marking tool 48 or a milling cutter 82, 82' as indicated in FIG. 1. Alternatively, the straight side portion S can be used to assist a cutting procedure (e.g. a plasterboard cut with a knife). The straight side portion S extends parallel to the longitudinal axis Y of the plate member 6. The plate member 6 is provided with a guiding member 76 extending along the longitudinal axis Y of the plate member 6. The guiding member 76 may have a constant cross section (e.g. a rectangular cross section), because it would allow for producing the plate member by extrusion. The plate member may e.g. be produced in aluminum by applying an extrusion process when the plate member has a fixed cross-sectional profile. The guiding member 76 is configured to guide a milling or cutting process.

An arm 16 is rotatably mounted to the plate member 6 and to the rod member 4. The arm 16 is rotatably attached to an angle setting device 8 slidably arranged in the groove 28. The angle setting device 8 comprises a rotary knob 10 configured to tighten the angle setting device 8 to the rod member 4. The angle setting device 8 comprises a pointer 20 adapted to indicate the angle or angular displacement (relative to 90 degrees) on the first scale portion 24.

A setting device 12 is slidably attached to the groove 28 of the rod member 4. The setting device 12 comprises a plate portion 32 and a fixation member 14 rotatably attached to the plate portion 32 of the setting device 12. The setting device 12 is configured to be arranged at any desired position on the rod member 4 in order to set the distance from the setting device 12 to the side portion S of the plate member 6. Accordingly, the tool 2 can be used to cut or mark a plate structure (not shown) at a predefined distance from the setting device 12. At the same time, it is possible to adjust the positon of the angle setting device 8 in order to adjust the angle α between the rod member 4 and the plate member 6.

The rod member 4 is provided with a receiving portion 18 arranged in the distal end of the rod member. The receiving portion 18 is adapted to receive a corresponding insert portion 22 of an additional rod member 4' arranged next to the rod member 4. Hereby, it is possible to elongate the rod member 4 by the additional rod member 4'. The additional rod member 4' is provided with a first scale portion 24' and a second scale portion 26'. The first scale portion 24' is indicative of the angle between the rod member 4' and the plate member 6. In one embodiment of the invention, the first scale portion 24' indicates the difference between 90 degrees and the angle between the rod member 4' and the plate member 6.

The rod members 4, 4' may be produced of any suitable material. It may be an advantage to produce the rod members 4, 4' of metal (e.g. aluminum or stainless steel). The plate member 6 may be produced of any suitable material including metal, plastic, wood or medium-density fiberboard. The plate member 6 may be produced of a transparent material.

FIG. 1B illustrates a schematic, top view of a section of a rod member 4 of a tool 2 according to the invention. The rod member 4 comprises a scale portion 26 provided with a centimeter scale. The rod member 4 moreover comprises a centrally arranged groove 28 into which an attachment structure is mounted. The attachment structure may be permanently fixed in this position in order to ensure that a corresponding plate member is attached in the correct position.

The attachment structure comprises a cylindrical pin member 44 protruding from a surrounding disc member 80 made of a magnetic material. An engagement groove may be provided in the pin member 44 in order to allow the pin member 44 to be screwed into a threaded portion of an underlying structure (e.g. a sliding block). The disc member 80 is arranged in a bore having a slightly larger inner diameter than the outer diameter of the disc member 80. Glue or a resilient structure may be provided in the gap 78 between the disc member 80 and the bore surrounding the disc member 80. The disc member 80 is configured to magnetically attract and bear against the surrounding structure surrounding the centrally arranged holes in the plate member (see FIG. 2D). Hereby, it is possible to attach the rod member 4 to a plate member in a manner in which the plate member can be held in place by magnetic attraction between the surrounding structure and the disc member 80.

FIG. 2A illustrates another perspective, top view of a tool 2 according to the invention. The tool 2 basically corresponds to the one shown in FIG. 1. The tool 2 comprises a plate-shaped plate member 6 and a rod member 4 rotatably attached to the plate member 6. An arm 16 is rotatably attached to the plate member 6 and to the rod member 4 and extends between the rod member 4 and the plate member 6. The arm 16 is rotatably attached to an angle setting device slidably attached to a groove centrally arranged in the rod member 4. By sliding the arm 16 along the length of the rod member 4, it is possible to change the angle between the rod member 4 and the plate member 6. A setting device 12 is slidably arranged in the groove of the rod member 4. Hereby, it is possible to change the position of the setting device 12 in order to use the setting device 12 to mark or cut a plate along the side portion of the plate member at a predefined distance from the setting device 12. The plate member 6 is provided with a guiding member 76 extending along the length of the plate member 6. The guiding member 76 is configured to guide a milling or cutting process.

FIG. 2B illustrates a close-up view of a setting device 12 of the tool shown in FIG. 2A. The setting device 12 comprises a knob 30 rotatably attached to a sliding block 34 arranged in the groove 28 of the rod member 4. The setting device 12 comprises a plate portion 32 provided with a through-going bore, through which a portion of the knob 30 extends. The setting device 12 furthermore comprises a L-shaped fixation member 14 rotatably attached to the plate portion 32.

FIG. 2C illustrates a close-up view of the arm 16 attached to a plate member 6 of the tool shown in FIG. 2A. The arm 16 is rotatably attached to the plate member 6 by means of a cylindrical pin member 36 rotatably attached into a corresponding cylindrical bore provided in the end portion of the arm 16. The pin member 36 is inserted into a hole (not shown) corresponding to an additional hole 38'. The plate member 6, moreover, comprises a hole 40 surrounded by a surrounding structure 42 made of a magnetic or magnetizable material. Hereby, the rod member 4 can be rotatably attached to the plate member by inserting a pin member (44 as shown in FIG. 2D) into the hole 40. The hole 40 is arranged along the longitudinal axis Y of the plate member 6. Since the holes in the plate member 6 are symmetrically arranged with respect to the longitudinal axis Y of the plate member 6, the plate member 6 can be rotated 180 degrees and still fit to the rod member 4 and the arm 16. It can be seen that the plate member 6 is provided with a guiding member 76 having a constant, rectangular cross section.

FIG. 2D illustrates a close-up view of the plate member 6 attached to the rod member 4 of the tool 2 shown in FIG. 2A. It can be seen that the rod member 4 is rotatably attached to the plate member 6 by means of a cylindrical pin member 44 that is inserted into a hole surrounded by a surrounding structure 42'. By applying a surrounding structure 42' made of a magnetic material or of a magnetizable material, it is possible to attach the rod member 4 to the plate member 6 in a manner, in which the plate member 6 can be held in place by magnetic attraction between the surrounding structure 42' and an abutting structure on the rod member 4 surrounding the pin member 44. It can be seen that the plate member 6 comprises additional holes 38", 38''' adapted to receive the pin member of the arm member (see FIG. 2C). The plate member 6 comprises a central portion M having a first height (thickness), wherein the central portion is surrounded by side portions S, S' having a smaller height (thickness). It can be seen that the plate member 6 is provided with a guiding member 76 having a constant, rectangular cross section.

FIG. 2E illustrates a close-up view of the angle setting device 8 of the tool 2 shown in FIG. 2A. The angle setting device 8 comprises a knob 10 having a shaft provided with a threaded portion engaging a corresponding threaded bore which is provided in the sliding block 34' arranged in the groove 28 which is provided in the rod member 4. The shaft 46 of the knob 10 extends through a bore provided in the arm member 16. Accordingly, the knob 10 can be used to tighten the angle setting device 8 and hereby fix it in a fixed position to the rod member 4. Furthermore, the position of the angle setting device 8 can be changed by sliding the angle setting device 8 along the groove 28 of the rod member since the sliding block is slidably arranged in the groove 28.

FIG. 3A illustrates a close-up view of the setting device 12 having a fixation member 14 attached to the end portion of a plate 50. The setting device 12 comprises a plate portion 32 which is provided with a recess comprising the L-shaped fixation member 14 which is rotatably attached to the plate portion 32 by means of a shaft 52 extending through the end portion of the plate portion 32, the recess and through a bore provided in the L-shaped fixation member 14. The setting device 12 comprises a knob 30 having an engaging structure (e.g. a threaded rod structure engaging a corresponding threaded bore which is provided in an underlying sliding block arranged in the groove 28 of the rod member 4) extending through a through-going bore provided in the plate portion 32. The position of the setting device 12 can be fixed to the rod member 4 by rotation of the knob 30. Likewise, the position of the setting device 12 can be changed by unscrewing the knob 30 and sliding the setting device 12 along the groove 28 in the rod member 4.

It can be seen that the rod member 4 comprises a first scale portion 24 with angle indications (measured in degrees), and that the rod member 4 comprises a second scale portion 26 (measured in centimeters) indicating the distance to the distal side portion of the plate member (not shown). In FIG. 3A, the setting device 12 is set at a distance of approximately 94 centimeters. Accordingly, the tool is set to make a marking at the distal side portion of the plate member (not shown) a distance of 94 centimeters from the end surface of the plate 50.

An angle setting device 8 is slidably attached to the rod member 4. The angle setting device 8 comprises a knob 10 having a pin configured to be displaced in order to engage with a corresponding receiving structure (recess or bore) provided in the bottom portion of the groove 28. The setting device 8 comprises a finger screw 56 configured to fix the angle setting device 8 to the rod member 4 by screwing the angle setting device 8 into the sliding block 34'. This may be achieved by screwing a threaded portion into a corresponding threaded receiving portion provided in the underlying sliding block 34'.

The angle setting device 8 comprises a pointer 20 indicating the relative angular displacement of the rod member 4 relative to the plate member (not shown) rotatably attached thereto. The first scale portion 24 is provided in such a manner that the angle indicated by the pointer 20 is zero if the rod member 4 extends perpendicular to the plate member (not shown) attached thereto. If the angle between the rod member 4 and the plate member (not shown) is increased by 10 degrees (from 90 degrees to 100 degrees), the pointer would indicate 10 degrees on the first scale portion 24. In FIG. 3A, the angle is about zero degrees. Accordingly, the tool is set to make a marking at the distal side portion of the plate member (not shown) in a manner in which the difference between the angle of the marking line and the angle of the end portion of the plate 50 is approximately zero degrees.

The angle setting device 8 comprises a knob 10 having a locking structure 54 which is shown in detail in FIG. 3B. The arm 16 is attached to the rod member 4 by means of the angle setting device 8.

FIG. 3B illustrates a schematic, cross-sectional view of an angle setting device 8 of a tool according to the invention. The angle setting device 8 corresponds to the one shown in FIG. 3A. The angle setting device 8 comprises a knob 10 having an outer structure formed as a finger screw 56 provided with a centrally arranged through bore 64. The angle setting device 8 additionally comprises a centrally arranged locking structure 54 provided with support legs 58, 58' extending parallel to the longitudinal axis Z of the locking structure 54.

In FIG. 3B, the support legs 58, 58' are supported by the support portion of the finger screw 56. The support portion of the finger screw 56 is, however, provided with a plurality of bores configured to receive the support legs 58, 58', whereby the locking structure 54 is vertically displaced (along the longitudinal axis Z) towards the underlying rod member 4. The finger screw 56 is configured to be screwed into the underlying sliding block 34' by means of corresponding engagement structures (not shown). The pin 62 is displaced into a recess 66 provided in the rod member 4, and the angle setting device 8 is fixed to the rod member 4. The pin 62 is attached to the central portion 60 of the locking structure 54.

An arm 16 is rotatably attached to the sliding block 34' and comprises a ring member 68 surrounding a bore, through which the pin 62 is adapted to be displaced.

The rod member 4 may comprise several recesses 66 at predefined angular values. Hereby, it is possible to set the angle setting device 8 into these predefined angular positions (e.g. 0 degrees, 11.25 degrees, 22.5 degrees and 45 degrees) in an easy and user-friendly manner.

It is important to underline that FIG. 3B is a schematic illustration, and that the engagement structures adapted to fix the finger screw 56 of the angle setting device 8 to the sliding block 34' are not shown. These engagement structures may be formed as corresponding threaded cylindrical structures provided in the finger screw 56 and in the sliding block 34'.

FIG. 4A illustrates a cross-sectional view of an angle setting device 8 of a tool according to the invention, wherein the angle setting device 8 is in a configuration, in which the locking pin 64 is raised above a recess 66 provided in the rod member 4. FIG. 4B illustrates a cross-sectional view of the angle setting device 8 shown in FIG. 4A in another configuration, and FIG. 4C illustrates a cross-sectional view of the angle setting device 8 shown in FIG. 4A and in FIG. 4B in a configuration, in which the locking pin 62 engages a corresponding recess 66 in the rod member 4. The pin 62 has been moved along the longitudinal axis Z of the locking structure 54.

In the configuration shown in FIG. 4A, the locking structure 54 is not in engagement with the recess 66 provided in the rod member 4. Accordingly, the sliding block 34' can slide along the groove and the length of the rod member 4. If the engagement structures (not shown) of the finger screw 56 engage the corresponding engagement structures of the sliding block 34', the angle setting device 8 may be fixed to the rod member 4.

When comparing FIG. 4A and FIG. 4B, it can be seen that the locking structure 54 has been rotated with respect to the longitudinal axis Z of the locking structure 54, and that the support legs 58, 58' have been partly received by bores (not shown) provided in the central portion of the finger screw 56. In FIG. 4B, the pin 62 rests against the rod member. In this configuration, the sliding block may be slid along the length of the rod member 4.

In FIG. 4C, the pin 62 has been moved along the longitudinal axis Z of the locking structure 54, and the support legs 58, 58' have been fully received by the bores in the central portion of the finger screw 56. Accordingly, the locking pin 62 engages the recess 66 in the rod member 4. Therefore, the angle setting device 8 and the knob 10 are fixed to the rod member 4. The locking structure 54 can be brought out from engagement with the recess 66 of the rod member 4 by displacing the locking structure 54 upwards along the longitudinal axis Z of the locking structure 54 and thereafter rotating the locking structure 54 about the longitudinal axis Z of the locking structure 54 in order to arrange the support legs 58, 58' on the support structure of the central portion of the finger screw 56.

FIG. 4D illustrates a top view of a section of a rod member 4 and an angle setting device 8 slidably attached thereto. It can be seen that the rod member 4 comprises a first scale portion 24 indicating the angular displacement of the rod member 4 relative to a direction perpendicular to the longitudinal axis (not shown) of the plate member (not shown). The rod member 4 moreover comprises a second scale portion 26 provided with a centimeter scale. A centrally arranged groove 28 extends along the length of the rod member 4.

The angle setting device 8 comprises a centrally arranged locking structure 54 slidably mounted in a knob 10 having a finger screw 56 surrounding the locking structure 54. An arm 16 is rotatably and slidably attached to the rod member 4 by means of a sliding block 34' provided with a pointer 20 indicating the previously mentioned angular displacement.

Figure 5A:
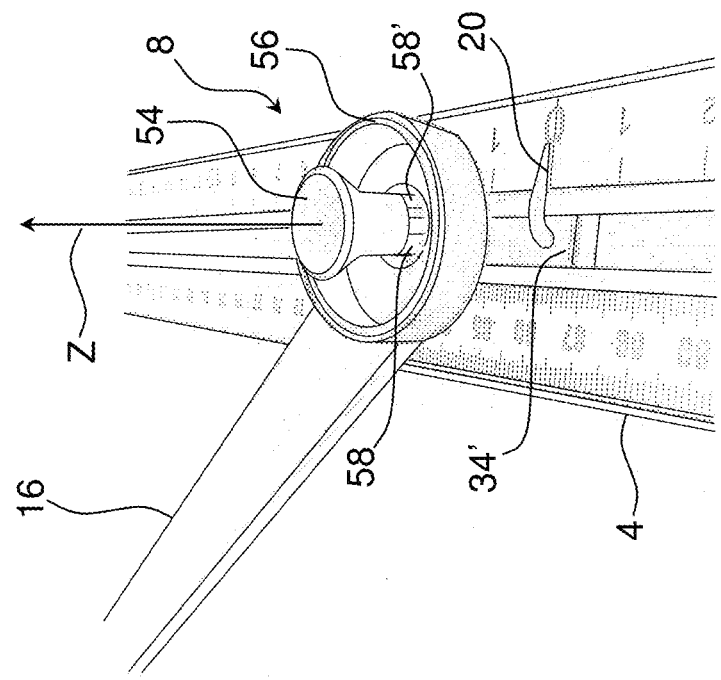
FIG. 5A shows a perspective, close-up view of an angle setting device of a tool according to the invention, wherein the angle setting device is in a configuration, in which the locking pin is raised above a recess provided in the rod member.
Figure 5B:
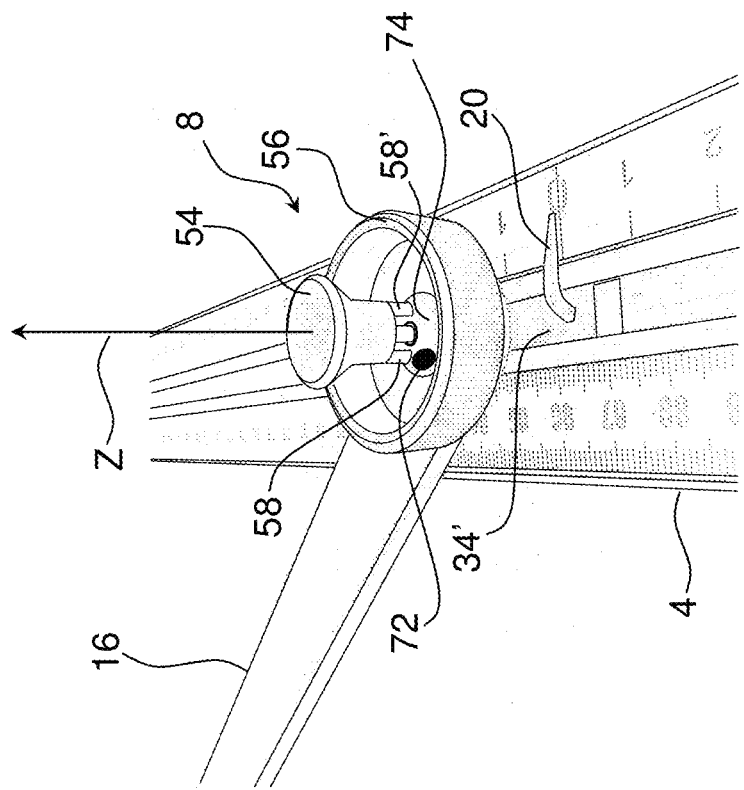
FIG. 5B shows a perspective, close-up view of the angle setting device shown in FIG. 5A in another configuration, in which the locking pin engages a recess provided in the rod member.

FIG. 5A illustrates a perspective, close-up view of an angle setting device 8 of a tool according to the invention, wherein the angle setting device 8 is in a configuration, in which the locking pin is raised above a recess provided in the rod member 4. FIG. 5B, on the other hand, illustrates a perspective, close-up view of the angle setting device 8 shown in FIG. 5A in a configuration, in which the locking pin engages a recess provided in the rod member 4.

In FIG. 5A, it can be seen that the support legs 58, 58' rest on the support structure 74 of the central portion of the finger screw 56, and that a bore 72 is provided in the support structure 74. The pointer 20 indicates that the angle between the rod member 4 and the direction perpendicular to the plate member (not shown) is 0 degrees.

In FIG. 5B, it can be seen that the support legs 58, 58' have been partly inserted into the bores in the support structure of the central portion of the finger screw 56. Accordingly, the locking structure 54 has been displaced downwards along the longitudinal axis Z of the locking structure 54. If the locking pin (see FIG. 4A, FIG. 4B or FIG. 4C) is positioned above the recess in the rod member 4, the locking pin will be received by the recess, and the angle setting device 8 will be fixed in this position. The angle setting device 8 can be brought into an unlocked configuration by lifting the locking structure 54 and the locking pin and rotating the locking structure 54 so that the support legs 58, 58' rest on the support structure 74 (as illustrated in FIG. 5A).

Figure 6A:
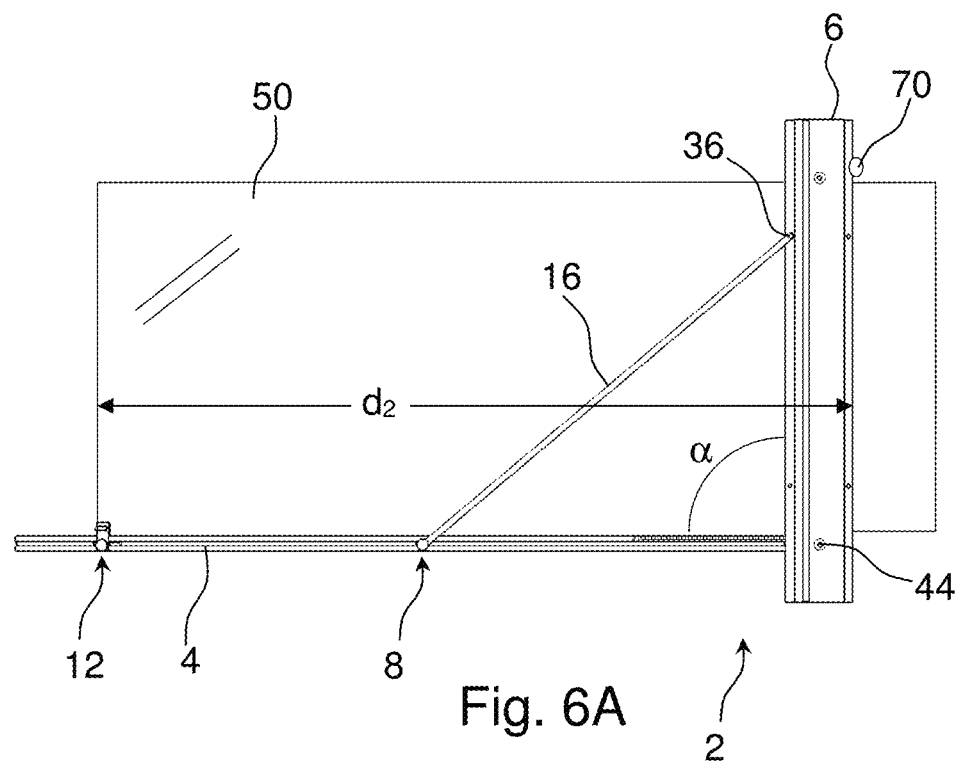
FIG. 6A shows a schematic, top view of a tool according to the invention used to cut a first plate.
Figure 6B:
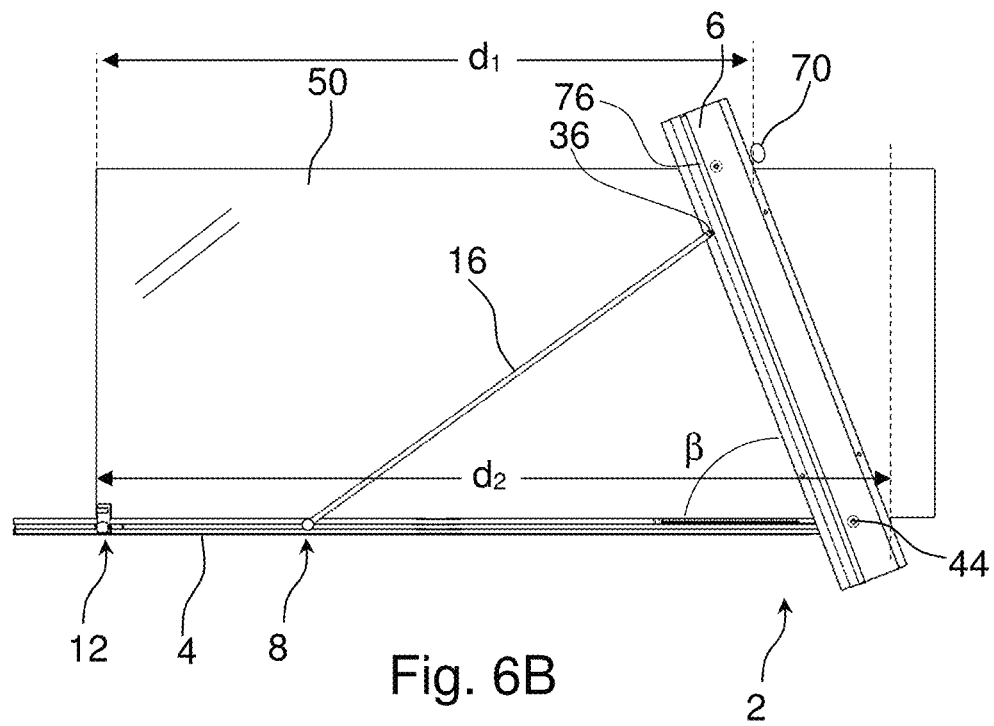
FIG. 6B shows a schematic, top view of the tool shown in FIG. 6A used to cut another plate.

FIG. 6A illustrates a schematic, top view of a tool 2 according to the invention used to cut a first plate 50, and FIG. 6B illustrates a schematic, top view of the tool 2 shown in FIG. 6A used to cut another plate 50.

The tool 2 comprises a rod member 4 provided with a groove extending along the length of the rod member 4. The tool 2, moreover, comprises a plate member 6 rotatably attached to the rod member 4 by means of a pin member 44 extending through a corresponding hole. Accordingly, the pin member 44 constitutes a shaft, about which the plate member can be rotated in order to change the angle α between the rod member 4 and the plate member 6.

The tool 2 comprises an arm 16 rotatably attached to the plate member 6 by means of a pin member 36 and to the rod member 4 by means of an angle setting device 8 attached to the rod member 4. A setting device 12 is movably mounted on the rod member 4. The setting device 12 bears against the plate 50 and thereby defines the distance $d_2$ from the end portion of the plate 50 to the plate member 6. By positioning the setting device 12 at the relevant position on the rod member 4, it is possible to define the distance $d_2$.

As it can be seen in FIG. 6B, the angle β between the rod member 4 and the plate member 6 can be changed by displacing the angle setting device 8 along the length of the rod member 4. Moreover, by changing the position of the setting device 12, it is possible to change the first distance $d_1$ and the second distance $d_2$ indicated in FIG. 6B.

When the tool 2 has been set into the desired position/setting, it is possible to cut the plate 50 by means of a cutting tool 70 (e.g. a knife) or to mark the plate 50 by means of a marking tool (e.g. a pencil).

It can be seen that the plate member 6 is provided with a guiding member 76 extending along the entire length of the plate member 6.

FIG. 7A illustrates a schematic end view of a plate member 6 according to the invention. It can be seen that the plate member 6 is provided with a guiding member 76 having a constant, rectangular cross section.

A resilient member 84 made of rubber is attached to the side portion S of the plate member 6. A resilient member 84 made of rubber prevents a plate from fraying during a cutting procedure (e.g. using a circular saw). The resilient member 84 is detachably attached to the plate member 6. Hereby, the resilient member 84 can be replaced due to wear. The resilient member 84 is inserted into a receiving groove provided in the plate member 6.

The opposite side portion S' is not provided with any additional structure. This side portion S' is adapted to be used when cutting a structure (e.g. a plasterboard) by a knife or when using a marking tool (e.g. a pencil).

FIG. 7B illustrates a schematic end view of a rod member 4 according to the invention. A groove extending along the length of the rod member 4 is provided centrally in the rod member 4. A sliding block 34 has been inserted into the groove. An arm 16 is attached to the rod member 4 by means of an angle setting device 8 having a finger screw 56 and a locking structure 54. The base plate 86 of the groove of the rod member 4 is provided with one or more recesses at predefined positions corresponding to predefined angular positions e.g. the angular position in which a pointer (not shown) indicates a predefined angular value e.g. corresponding to a number of predefined values such as 0 degrees, 11.25 degrees, 22.5 degrees and 45 degrees. The angle setting device 8 comprises a pin member (not shown) arranged and configured to be inserted into the recesses in order to lock the angle setting device 8 in the predefined angular positions.

LIST OF REFERENCE NUMERALS

2 Tool
4, 4' Rod member
6 Plate member
8 Angle setting device
10 Knob
12 Setting device
14 Fixation member
16 Arm
18 Receiving portion (female portion)
20 Pointer
22 Insert portion (male portion)
24, 24', 26, 26' Scale portion
28 Groove
30 Knob
32 Plate portion
34, 34' Sliding block
36 Pin member
38, 38', 38'', 38''' Hole
40, 40' Hole
42, 42' Surrounding structure
44 Pin member
46 Shaft
48 Marking tool
50 Plate
52 Shaft
54 Locking structure
56 Finger screw
58, 58' Support leg
60 Central portion
62 Pin
64 Bore
66 Recess
68 Ring member
70 Cutting tool
72 Bore
74 Support structure
76 Guiding member
78 Gap
80 Disc member
82, 82' Milling cutter
84 Resilient member
86 Base plate
X, Y, Z Axis
S, S' Side portion
M Central portion
α, β Angle
$d_1$, $d_2$ Distance

The invention claimed is:

1. A tool for assisting the process of marking or cutting structures in a predefined manner, wherein the tool comprises:
   a rod member having a longitudinal axis;
   a plate member rotatably attached to the rod member by a pivot joint comprising a cylindrical pin attached to the rod member that is inserted into a bore of the plate member, wherein the cylindrical pin is at least partly surrounded by a plane structure made of a magnetic or magnetizable material and a receiving portion of the plate member is arranged and configured to be brought into contact with the plane structure, the plane structure and the receiving portion being made of materials ensuring that the plane structure and the receiving portion are attracted to each other by magnetic attraction;
   wherein the bore is arranged along a longitudinal axis of the plate member and additional holes are arranged symmetrically with respect to the longitudinal axis of the plate member;

at least one of the additional holes configured to mate with an arm that is removably attached to the rod member and to the plate member; and one or more magnetic or magnetizable structures configured to provide a magnetic force between the arm and the plate member.

2. The tool of claim 1 further comprising a setting device removably attached to the rod member.

3. The tool of claim 2, wherein the setting device comprises a fixation member moveably attached to the setting device.

4. The tool of claim 2 further comprising an angle setting device removably attached to the rod member.

5. The tool of claim 4, wherein the angle setting device comprises a locking structure comprising an engagement structure configured to lockingly engage with a corresponding engagement structure provided in the rod member.

6. The tool of claim 2, wherein a groove extends along the length of the rod member.

7. The tool of claim 6, wherein the groove extends along the entire length of the rod member.

8. The tool of claim 2, wherein the tool comprises an additional rod member provided with an attachment structure adapted to engage with a corresponding attachment structure of the rod member.

9. The tool of claim 1 further comprising an angle setting device removably attached to the rod member.

10. The tool of claim 9, wherein the angle setting device comprises a locking structure comprising an engagement structure configured to lockingly engage with a corresponding engagement structure provided in the rod member.

11. The tool of claim 1, wherein a groove extends along the length of the rod member.

12. The tool of claim 11, wherein the groove extends along the entire length of the rod member.

13. The tool of claim 1, wherein the tool comprises an additional rod member provided with an attachment structure adapted to engage with a corresponding attachment structure of the rod member.

* * * * *